(12) United States Patent
Yee

(10) Patent No.: US 8,472,575 B2
(45) Date of Patent: Jun. 25, 2013

(54) SIGNAL EVALUATION AND ADJUSTMENT

(75) Inventor: Mong Suan Yee, Guildford (GB)

(73) Assignee: MStar Semiconductor, Inc., Grand Cayman (KY)

( * ) Notice: Subject to any disclaimer, the term of this patent is extended or adjusted under 35 U.S.C. 154(b) by 1040 days.

(21) Appl. No.: 12/374,712

(22) PCT Filed: Jul. 26, 2007

(86) PCT No.: PCT/GB2007/002826
§ 371 (c)(1),
(2), (4) Date: Jan. 22, 2009

(87) PCT Pub. No.: WO2008/015389
PCT Pub. Date: Feb. 7, 2008

(65) Prior Publication Data
US 2009/0323791 A1  Dec. 31, 2009

(30) Foreign Application Priority Data
Aug. 1, 2006 (GB) .................................. 0615292.0

(51) Int. Cl.
*H04B 1/10* (2006.01)
(52) U.S. Cl.
USPC .......................................... 375/350; 375/346
(58) Field of Classification Search
USPC ....................... 375/147, 229, 285, 350, 8, 346
See application file for complete search history.

(56) References Cited

U.S. PATENT DOCUMENTS

| | | | | |
|---|---|---|---|---|
| 5,809,086 | A * | 9/1998 | Ariyavisitakul | 375/332 |
| 6,442,193 | B1 * | 8/2002 | Hirsch | 375/147 |
| 6,804,313 | B2 * | 10/2004 | Skafidas et al. | 375/350 |
| 7,450,654 | B2 * | 11/2008 | Singh et al. | 375/260 |
| 7,917,836 | B1 * | 3/2011 | Burd | 714/795 |
| 2003/0058962 | A1 * | 3/2003 | Baldwin | 375/316 |
| 2004/0008618 | A1 * | 1/2004 | Shirakata et al. | 370/208 |
| 2006/0251198 | A1 * | 11/2006 | Ma et al. | 375/350 |
| 2007/0071071 | A1 * | 3/2007 | Li et al. | 375/147 |
| 2007/0127355 | A1 * | 6/2007 | Li et al. | 370/201 |
| 2010/0054371 | A1 * | 3/2010 | Namgoong et al. | 375/340 |

FOREIGN PATENT DOCUMENTS

EP  1596502 B1  1/2008

OTHER PUBLICATIONS

Ghauri, I. et al., "Linear Receivers for the DS-CDMA downlink Exploiting Orthogonality of Spreading Sequences," signals, Systems & Computers, 1998. Conference Record of the Thirty-Second Asilomar Conference on Pacific Grove, CA, Nov. 1-4, 1998, Piscataway, NJ, IEEE, vol. 1, Nov. 1, 1998, XP010324192, pp. 650-654.

* cited by examiner

*Primary Examiner* — Emmanuel Bayard
(74) *Attorney, Agent, or Firm* — Edell, Shapiro & Finnan, LLC

(57) ABSTRACT

A method of assessing a received signal acquired through a physical channel and comprising a pilot channel, the method comprising estimating from an oversampled version of the received signal an oversampled response for the physical channel and quantifying noise in the received signal using the oversampled received signal and the oversampled channel response.

18 Claims, 6 Drawing Sheets

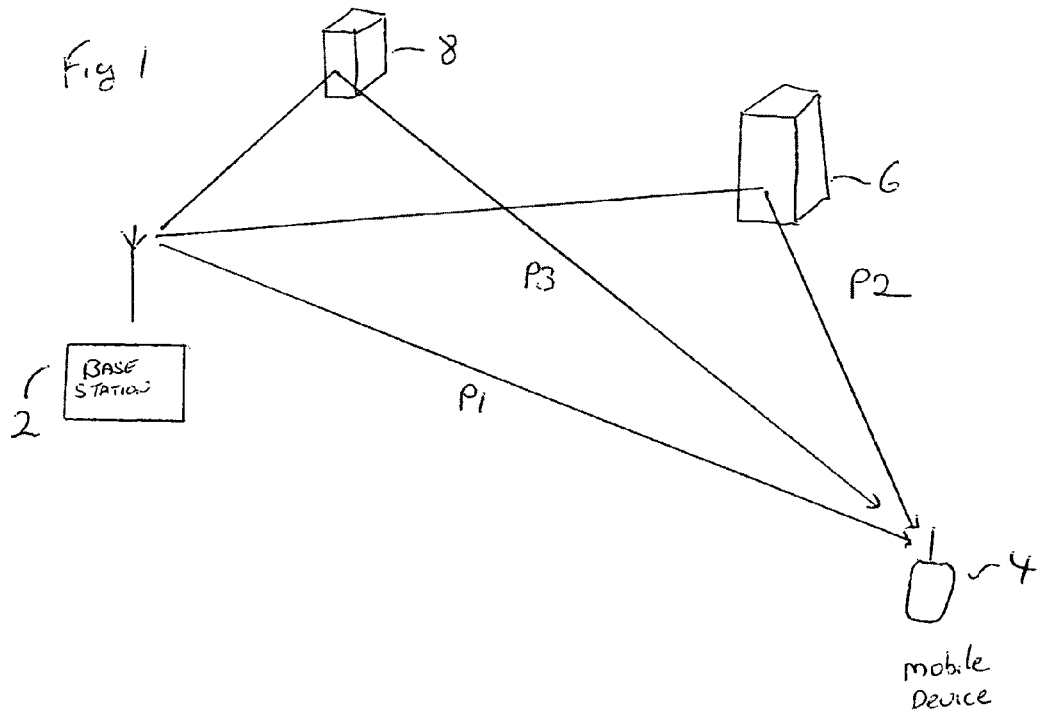
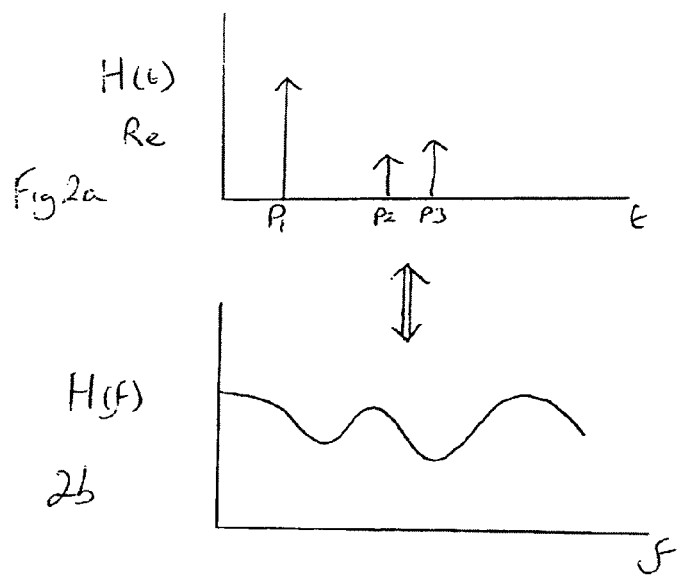

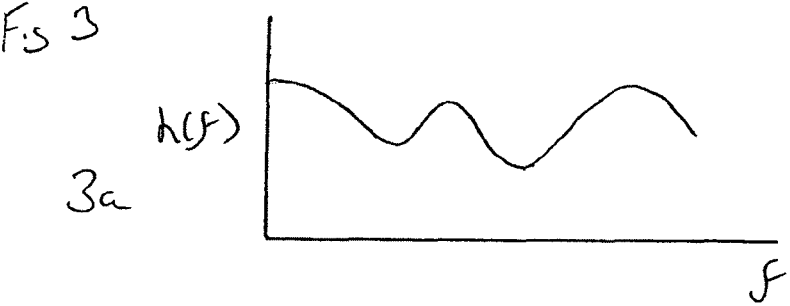
Fig 3
3a   $h(f)$
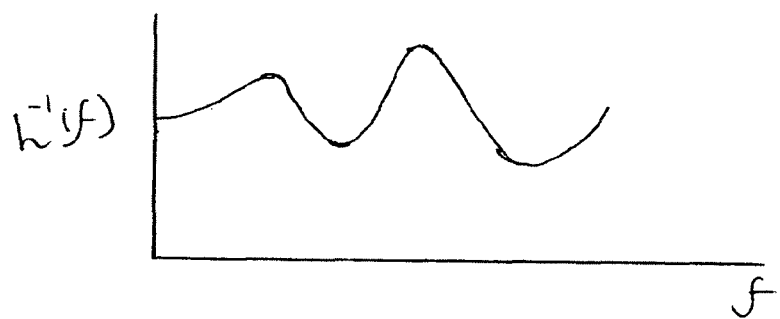
3b   $h^{-1}(f)$
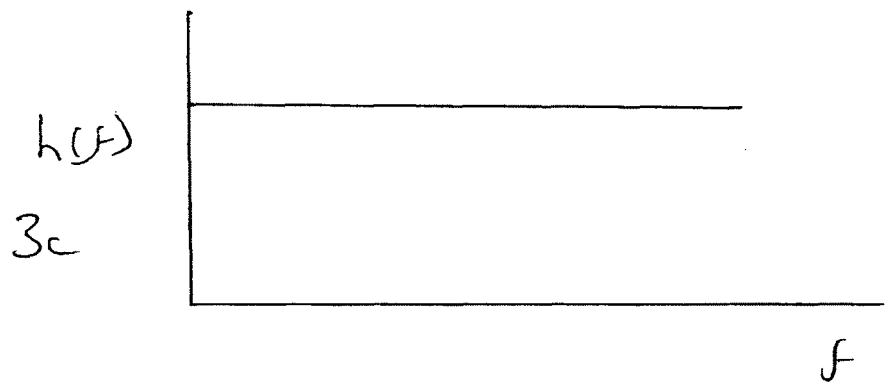
3c   $h(f)$

SIGNAL EVALUATION AND ADJUSTMENT

FIELD OF THE INVENTION

The invention relates to the characterisation of a signal received through a physical channel and to the compensation, based on information so gleaned, of effects arising from the non-ideal nature of the channel.

According to one aspect, the invention provides a method of assessing a received signal acquired through a physical channel and comprising a pilot channel, the method comprising estimating from an oversampled version of the received signal an oversampled response for the physical channel and quantifying noise in the received signal using the oversampled received signal and the oversampled channel response (the invention extends to corresponding apparatus).

In certain embodiments, the quantification of the noise comprises calculating a channel quality indicator (CQI) describing how noisy is a wanted component within the received signal.

According to another aspect, the invention provides a method of assessing a received signal acquired through a physical channel and comprising a pilot channel, the method comprising estimating from an oversampled version of the received signal an oversampled response for the physical channel and deducing the relation of the power of the pilot channel to the power of the entire received signal using the oversampled received signal and the oversampled channel response (the invention extends to corresponding apparatus).

The invention can quantify noise in a received signal and deduce a relation between pilot channel power and total power for the received signal. This information about noise and pilot channel power may be used to determine filter coefficients of an equaliser arranged to act on the received signal.

According to a further aspect, the invention provides a method of deducing filter coefficients for an equaliser that is to act on a received signal acquired through a physical channel and comprising a pilot channel, the method comprising estimating from an oversampled version of the received signal an oversampled response for the physical channel and applying the oversampled received signal and the oversampled channel response in the deduction of the filter coefficients (the invention also extends to corresponding apparatus).

The oversampling in the received signal and its channel response may be temporal or spatial. In the temporal case, a data element of the received signal may be sampled at multiple instants. In the spatial case, there may be several antennae acquiring the received signal such that each antenna provides an "oversample". Within the invention, oversampling may be achieved by a combination of the temporal and spatial techniques.

The oversampling is with respect to data elements of the received signal. In certain embodiments where the received signal is one transmitted within a CDMA system, these data elements may be chips of a spread and scrambled signal. In other embodiments, the data elements may be modulation symbols, e.g. in an EDGE system.

The invention may operate on the received signal in a form with or without transmit diversity.

The pilot channel referred to above may be, for example, a logical channel in the form of a CPICH in the case of a UMTS or HSDPA system, a logical channel in the form a training sequence in a TDMA system or a pilot sub-carrier in the case of an OFDM system.

The invention also extends to program code for execution through suitable data processing hardware to implement the processing techniques described above.

BRIEF DESCRIPTION OF THE DRAWINGS

The present invention will now be described by way of non-limiting example, with reference to the accompanying drawings, in which:

FIG. 1 schematically illustrates how multi-path distortion can arise;

FIG. 2a schematically illustrates a transmission channel impulse response in the presence of multi-path distortion, and FIG. 2b represents the corresponding frequency response of the channel;

FIG. 3a shows an exemplary channel response, FIG. 3b shows an inverse response estimated by a mobile device and used to filter a received signal in an attempt to return the frequency response to that corresponding to the frequency response of an ideal channel as shown in FIG. 3c;

DESCRIPTION OF CERTAIN EMBODIMENTS OF THE INVENTION

Figure 4:
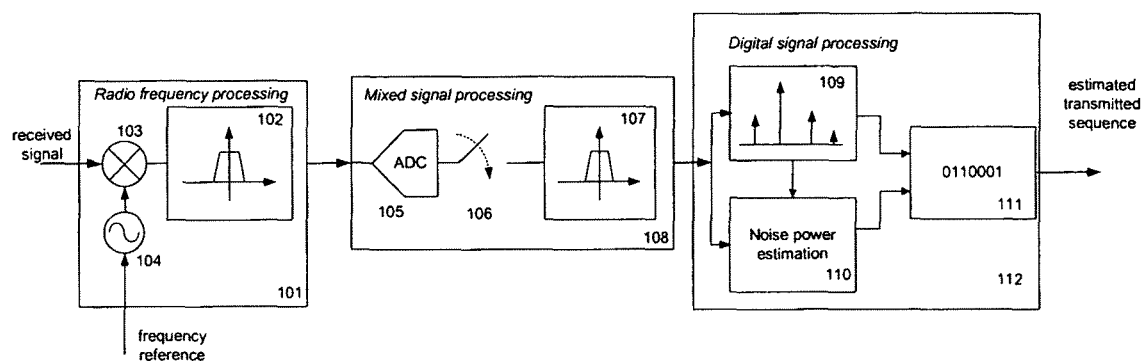
FIG. 4 shows in block diagram form the components within a mobile terminal, such as a mobile telephone.

Data in a CDMA system is represented by a series of symbols, for example as in the well known QPSK or 16 QAM modulation schemes. Each symbol has a respective position in the phasor diagram for the transmission scheme, and in order to correctly decode symbols the receiver must correctly identify the in-phase (real) and quadrature-phase (imaginary) parts of the transmitted signal. In fact, the symbols are further modulated by multiplication with spreading codes such that each symbol is represented by a plurality of "chips". These spreading codes make the symbols mutually orthogonal under ideal conditions.

Each chip has to propagate along a physical transmission path between the base station and the mobile unit. The properties of the physical path are ill defined and indeed multiple transmission paths may exist between the base station and the mobile device due to the existence of one or more reflectors. Such a situation is schematically illustrated in FIG. 1 where a base station 2 is in communication with a mobile device 4. In this example a first path, P1, represents a notionally direct path between the base station 2 and the mobile device 4. However, reflection occurring at a large object, such as a building 6, results in the formation of a second path P2, between the base station 2 and the mobile device 4. As the signal reflects from the building it undergoes an arbitrary attenuation due to the properties of the material of the building and may also undergo an arbitrary phase change. Similarly a third transmission path P3 may also occur because of the existence of a further reflector 8 with a further arbitrary change in amplitude and arbitrary change in phase occurring along the path P3.

As a result, when a chip is received at the mobile device it may in fact be represented by a first signal component resulting from transmission path P1, a second time delayed signal component resulting from path P2 and having an unknown amplitude and phase change compared to the signal received along path P1 and a further component resulting from path P3 again having an arbitrary attenuation and phase change.

In order to function correctly, the mobile device needs to compensate for the undesirable properties of the physical transmission path, which from the above description may be regarded as the sum of individual physical transmission paths P1, P2, P3 and so on.

It is known that if the base station could transmit an impulse then the properties of the ideal channel would be such that a single impulse would be received at the mobile device. However, in the presence of multiple reflectors then the impulse response in the time domain of the propagation channel will consist of a plurality of impulse responses received at different times and with different amplitudes. This is schematically illustrated in FIG. 2a. Here, each of the impulse responses is designated P1, P2 or P3, as appropriate to match with the transmission path illustrated in FIG. 1. FIG. 2a shows the in-phase impulse response and it will be appreciated that because phase changes occur at the reflectors then a further plot of impulse response versus time can also be produced for the imaginary component of the impulse response.

It is known that a signal in the time domain can also be represented in the frequency domain by use of a Fourier transform. The frequency response of the ideal channel would be flat, that is a uniform amplitude with respect to frequency. However the existence of multiple responses in the time domain gives rise to a modified response in the frequency domain as schematically illustrated in FIG. 2b.

It is known to estimate the channel response in the frequency domain and from that response to calculate an inverse as shown in FIG. 3b such that the product of the channel response, as shown in FIG. 3a and the inverse response as shown in FIG. 3b gives rise to a nominally flat frequency response as shown in FIG. 3c.

In practical systems, the estimate of the channel of coefficients is further complicated by the presence of noise. Noise can result from self-generated noise within the receiver and also in-channel noise from other transmission sources within range of the receiver. Indeed, in a CDMA system, a further source of noise is leakage from other CDMA channels after despreading because the presence of reflectors can lead to loss of orthogonality between individual ones of the spreading codes used within the CDMA system. Thus a signal in one channel can start to manifest itself as noise in another channel after despreading.

It is important to account for the noise sources as calculation of the inverse response may cause the noise power within the received signal to rise to levels where the noise is more troublesome than the imperfect channel characteristics (because enhancement in the inverse filter to counter the channel attenuation also enhances the noise power and hence degrades the signal to noise ratio). Therefore a compromise may need to be made between the noise power and linearization of the frequency response.

The signal transmitted by the base station includes not only data, but a control channel and a pilot signal. The pilot signal is known to the receiver and is used by the receiver in order to estimate the channel properties, which are then represented by channel coefficients because the non-flat frequency response of the channel can effectively be represented as a filter defined by a series of filter coefficients.

Thus, we can see that the received signal comprises the transmitted signal (which could consist of a combination of the data, control and pilot signals) distorted by the propagation channel and the additive noise. In most cases, only the power of the pilot signal as transmitted is known since the pilot sequence is known at the user equipment, e.g. mobile telephone. Within a CDMA system, the power of the pilot signal distorted by the transmission channel can be obtained by correlating the pilot sequence with the received signal. The noise power can be estimated if the ratio of the pilot signal to the total transmitted signal from the serving cell is known. However, this information is not transmitted to at the user equipment. Therefore an estimate of the relative power of the pilot signal with respect to the total transmitted signal is required to derive the noise power.

As noted before many wireless communication systems require the knowledge of the receiver noise power (if the transmit signal power has been normalised to one) or the signal-to-noise power ratio. The noise power estimate can be used to derive a "channel quality indicator" (CQI) for adaptive coding and modulation (AMC) schemes or power control. For example, based on 3GPP standard described in 3GPP TS25.214 V5.5.0, "Physical layer procedures (FDD), Release 5", the relation between CQI reported to the Node-B and SNR for a block error rate (BLER) of 0.1 can be approximated through a linear function [see "Usage of link-level performance indictors for HSDPA network-level simulations in E-UMTS", F. Brouwer, et. al., ISSSTA 2004, Sydney, Australia, 30 Aug.-2 Sep. 2004], $$CQI = \begin{cases} 0 & SNR \leq -16 \\ \left\lfloor \frac{SNR}{1.02} + 16.62 \right\rfloor & -16 < SNR < 14 \\ 30 & 14 \leq SNR. \end{cases}$$

A linear minimum mean square error equaliser requires the information of the noise power to optimize the equalizer coefficients based on the minimum mean square error criterion. The reliability of the symbol detection and channel decoding, etc, will also require a good estimate of the noise power or SNR.

As noted before, equalization is required to improve data detection performance of the receiver in a multi-path channel environment by mitigating the inter-symbol interference. In order to compensate for the multi-path distortion it is known to use a Linear minimum mean square error (LMMSE) equalizer. This is a relatively simple technique where the equalizer is a linear filter with the filter coefficients set using minimum mean square error (MMSE) criterion. Here, the error of the equalized signal with respect to the transmit signal is minimized by the linear filter. This technique requires the knowledge of the channel impulse response (CIR) and the ratio of the received signal to the noise power ($E_T/N_o$) as described in Hooli's Thesis ["Equalization in WCDMA Terminals", Kari Hooli, Thesis, University of Oulu, Finland, 2003, ISBN 9514271831 (http://herkules.oulu.fi/isbn9514271831/)] (see Equation 3.15). Poor CIR and $E_T/N_o$ estimation will degrade the performance of the equalizer.

For a CDMA system, the total transmitted signal is a code division multiplex of data intended for different UEs, such as different telephones or data cards. Therefore the total transmitted signal power with respect to the received signal is not explicitly known at the UE. Instead, only the power of the transmitted signal for a given UE can be derived based on the known code sequence of the channels for that user equipment. Therefore, it is not trivial to estimate the ratio of the total power of the signal component to the power of the noise component of the received signal especially since the transmitted signal also contain data signals for other user terminals or other user equipment.

In general terms, a chip of a received signal at instant k is given by:

$$r_k = \sum_{c=1}^{C} h_k^H S_{c,k} a_{c,k} + n_k \quad \text{Equation 1}$$

where:
- $h_k$ is a (L×1) vector of the L-length channel impulse response,
- $S_{c,k}$ is (L×1) vector of the transmitted chip sequence for physical channel c with unity power,
- $a_{c,k}$ is the amplitude gain of the transmitted signal for channel c, and
- $n_k$ is the AWGN noise component (include interference from non-serving cells) with power spectral density of $N_o$.
- C is the total number of physical channel served by the serving node.

The received signal after automatic gain control (AGC) is:

$$\tilde{r}_k = g_k r_k, \quad \text{Equation 2}$$

$$= \sum_{c=1}^{C} \tilde{h}_k^H S_{c,k} a_{u,k} + \tilde{n}_k$$

where:

$$\tilde{h}_k = g_k h_k \quad \text{Equation 3}$$
$$\tilde{n}_k = g_k n_k$$

The "~" represents values after gain control has been applied and $g_k$ is the AGC gain.

The coefficients of the approximated N-tap LMMSE equaliser are given by:

$$W_k = (\tilde{H}_k \tilde{H}_k^H + \tilde{N}_{o,k}/E_{T,k} I)^{-1} \tilde{H}_k \quad \text{Equation 4}$$

where
- $\tilde{H}_k$ is a Toeplitz channel matrix for the channel response at the kth sampling instant.
- $\tilde{H}_k^H$ is the hermitian matrix of $\tilde{H}_k$, i.e. the conjugate transpose of $\tilde{H}_k$.
- $\tilde{N}_{o,k}$ is the noise power at sampling instant k.
- $E_{T,k}$ is the transmitted power at sampling instant k.
- I is the unit matrix.

The (L×N) Toeplitz channel matrix is derived from $$\tilde{H}_k = \text{toeplitz}(\tilde{h}_k) \quad \text{Equation 5}$$

and $$E_{T,k} = \sum_{c=1}^{C} a_{c,k}^2 \quad \text{Equation 6}$$

and $$\tilde{N}_{o,k} = g_k N_o \quad \text{Equation 7}$$

In the 3GPP standard, a Common Pilot Channel (CPICH) is provided which is a known sequence of bits which are modulated, spread and added to the downlink signal (see 3GPP TS 25.11; Technical Specification Group Radio Access Network: Physical channels and mapping of transport channels onto physical channels (FDD)). Knowledge of the common pilot channel signal enables the properties of the propagation channel to be estimated.

Since the estimated channel delay profile is derived from the Common Pilot Channel (CPICH), the power of the estimated channel is relative to CPICH power $a_{CPICH,k}^2$ where the $$\frac{E_c}{I_{or}}$$

(the ratio of the average transmit energy per chip for the physical channels to the total transmit power spectral density) of the CPICH, i.e. the "relative pilot signal power", can be represented as $$\frac{E_c}{I_{or\,CPICH}} = a_{CPICH,k}^2 / E_{T,k} \quad \text{Equation 8}$$

Therefore, based on Equation 2, the estimated channel delay profile using CPICH with estimation error given by Toeplitz matrix $E_k$ is given by:

$$\hat{H}_k = a_{CPICH,k} \tilde{H}_k + E_k \quad \text{Equation 9}$$

Here $E_k$ represents cross correlation errors from the other channels, and which have leaked into the wanted channel due to orthogonality being lost because of the multi-path distortion.

Therefore, ignoring the estimation error (and this is a reasonable assumption as channel impulse response estimation error can be significantly reduced using filtering), the coefficient of the LMMSE equaliser is derived based on Equation 4 as:

$$W_k = \left(\hat{H}_k \hat{H}_k^H / a_{CPICH,k}^2 + \tilde{N}_{o,k} E_{T,k} I\right)^{-1} \hat{H}_k / a_{CPICH,k} \quad \text{Equation 10}$$

$$= \left(\hat{H}_k \hat{H}_k^H + \tilde{N}_{o,k} \frac{a_{CPICH,k}^2}{E_{T,k}} I\right)^{-1} \hat{H}_k a_{CPICH,k}$$

The derivation of suitable coefficients of the equaliser to compensate for the multi-path distortion requires knowledge of the relative CPICH power $$\frac{a_{CPICH,k}^2}{E_{T,k}}$$

and the noise power $\tilde{N}_{o,k}$. The relative CPICH power can be referred to in more generic sense as the relative power of the pilot channel.

FIG. 4 schematically depicts various processing stages performed in a receiver constituting an embodiment of the present invention. It should be noted that the blocks shown in FIG. 4 represent processing operations performed on a received signal but do not necessarily correspond directly to physical units that may appear within a practical implementation of a receiver. A radio frequency stage 101 receives the radio signal and down-converts it by using a mixer 103 to mix the received signal with a signal derived from a local oscillator 104. During the radio frequency processing the local oscillator frequency is selected such that the received signal is down-converted to base-band. Following this carrier down-conversion, the signal is low-pass filtered in a filter 102 and then passed to the mixed-signal processing stage 108. The mixed signal processing stage includes an Analogue-to-Digital converter (ADC) 105, a sampling device 106 and a low pass filter 107. The resulting signal, which has been converted to a digital form, is supplied to the digital signal processing stage 112 where it is processed such that the transmitted information can be recovered.

The received signal is first processed by the channel estimation unit 109 where an estimate of the Channel Impulse Response (CIR) is generated. This is a known technique that does not need to be described in detail as it is known to the person skilled in the art Using the estimated channel impulse response, the noise power is estimated in unit 110. This estimated channel impulse response and noise power is processed in combination with the received signal by the demodulation unit 111, which comprises a channel equalizer and channel decoder, such that the sequence of data bits can be recovered.

At the receiver, the power of the signal components depends on the propagation channel link between the serving cell and the UE whereas the noise component is independent of this propagation channel link. Therefore, forming estimates of the component that is dependent on the propagation channel profile (the channel profile is estimated by the receiver), and the component that is not, enables the signal and noise components to be distinguished to provide the estimated noise power and the relative pilot signal power.

If the received signal is over-sampled in time, the unknown parameters, i.e. the noise power and the relative pilot signal power, can be obtained by solving a set of N equations. The number of simultaneous equation can be 'overstated', i.e. more than the number of unknown and thus it can be used to average the estimate of the unknown parameters, i.e. the noise power and the relative pilot signal power.

The method of the present invention involves obtaining the received power and channel profile of different phases of the received signal, i.e. the different phases of the oversampled received signal and the channel impulse response in time. Since the propagation channel and also the power of the additive noise are dynamic, the instantaneous power of the received signal has to be considered instead of the long-term average. The instantaneous received power can be obtained by averaging the received signal power within a time window where the physical channel properties and the noise statistics are considered constant.

In use, the duration of each chip is known and the sampling of the chip can be made at selected positions within the chip. The chip is typically shaped by applying a raised cosine to the chip. Thus if the chip has a duration tc, then sampling the chip at $\{0, tc, 2tc, \ldots\}$ and $$\left\{ \frac{tc}{2}, \frac{3tc}{2}, \frac{5tc}{2}, \ldots \right\}$$

Figure 5:
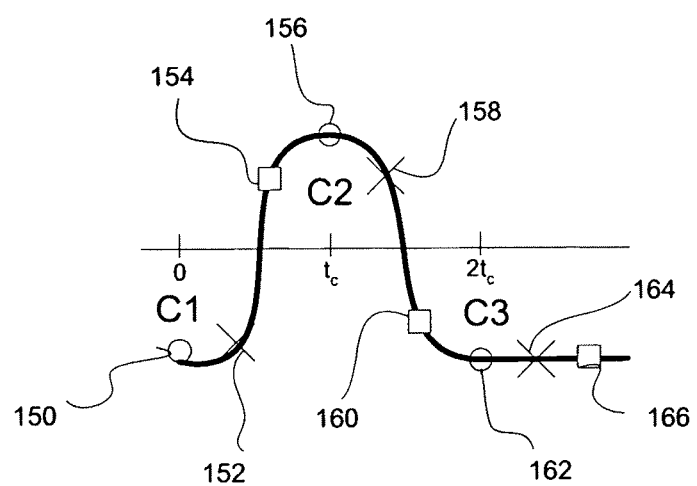
FIG. 5 schematically illustrates over-sampling of received chips of a transmitted signal.

(i.e. twice over-sampling) should, under appropriate circumstances, result in average power values that follow the (twice oversampled) power profile from the combination of the pulse shaping raised cosine filter and channel. Variations in the sampled power profile can be attributed to the instantaneous contribution of noise. Other combinations of sampling instants can be used, e.g. $\{0, tc, 2tc, \ldots\}$, $\{tc/3, 4tc/3, 7tc/3, \ldots\}$ and $\{2tc/3, 5tc/3, 7tc/3, \ldots\}$ for oversampling of three. The case for over-sampling of three is shown in FIG. 5. Here we show a sequence of three chips in the transmitted signal. Because the signal is the pilot signal we know what chip sequence we are expecting to receive. In FIG. 5 we have assumed for simplicity that the chip values are −1, 1, −1, corresponding to chips C1, C2 and C3, respectively. We also know the chips have a raised cosine applied so as to limit the rate of transition between neighboring chips of a different value.

Taking this knowledge of the expected chip values, we can over-sample a chip. In a three times over-sampling scheme the chip could be sampled at ntc, ntc+tc/3 and ntc+2tc/3 where n=0, 1, 2, . . . . Oversampling of the ntc phase represented by circles 150, 156 and 162 should provide the average chip power attenuated by the channel.

Alternatively sampling may occur at the ntc+tc/3 and ntc+2tc/3 over-sampling phase of each chip, i.e. at sample points $\{152, 158, 164\}$ and $\{154, 160, 166\}$, respectively, where the average power of the sample points are again known so variations from the expected relative values are attributable to noise.

The over-sampling can be more than twice, e.g. 3, 4, 5, or so on.

Figure 6:
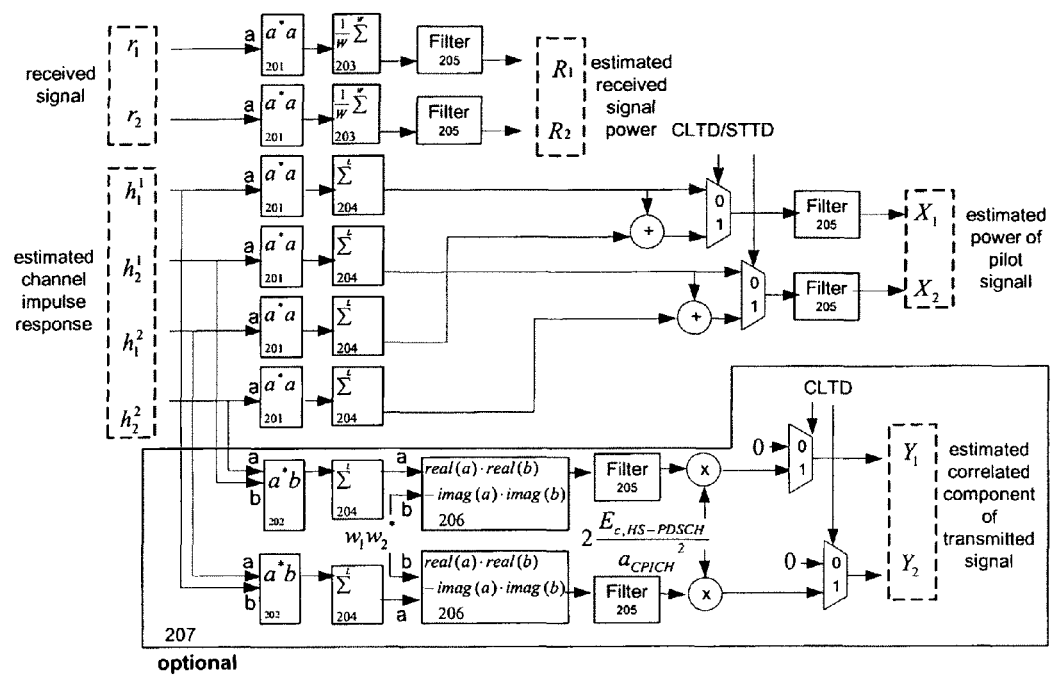
FIG. 6 schematically shows processing blocks within a mobile device operating in accordance with the present invention.

FIG. 6 shows a processing arrangement for performing signal processing. For simplicity we shall assume that the signal is twice over sampled such that each chip is represented by sample $r_1$ and $r_2$. The samples have both a real (in phase) and imaginary (quadrature phase) component. For each sample a multiplier multiplies the sample by its complex conjugate so as to estimate the power of the sampled signal at the sampling instant. The values occurring within a filtering window are averaged in a digital averager 203 and then filtered by a filter 205 to give estimates of the received signal power $R_1$ and $R_2$.

A similar process is performed on estimates of the channel impulse response which are used to estimate the power of the pilot signal. The way in which these estimates, which appear as $h_1^1$, $h_2^1$, $h_1^2$ and $h_2^2$ in the Figure, are combined depends on the transmit diversity mode being used, as will be explained later.

A further optional block 207 can be included to estimate the cross product of a spatially correlated transmitted signal in closed loop transmit diversity transmission schemes. This block includes complex multipliers 202 providing signals to summers 204 which in turn provide signals to blocks 206 (containing complex multipliers and adders arranged to perform certain mathematical functions as indicated in FIG. 6) which in turn provide signals to filters 205.

The estimates $R_1$, $R_2$, $X_1$, $X_2$, $Y_1$ and $Y_2$ are provided to processing entities 301 and 302 (FIG. 7) which use these estimates to calculate the ratio of the pilot power to the total transmitted power, as will be set out in Equation 26, and the noise power, as will be set out in Equation 27. Each of these estimates is itself noisy so is low pass filtered by filters 303 and 304.

Figure 7:
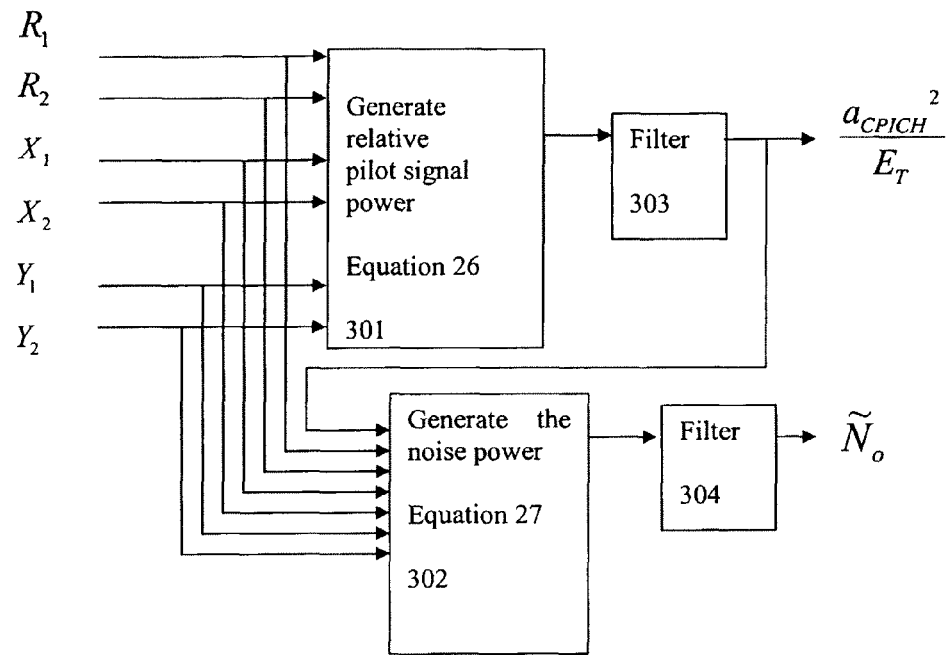
FIG. 7 schematically illustrates further processing blocks within a mobile device constituting an embodiment of the present invention.
Figure 8:
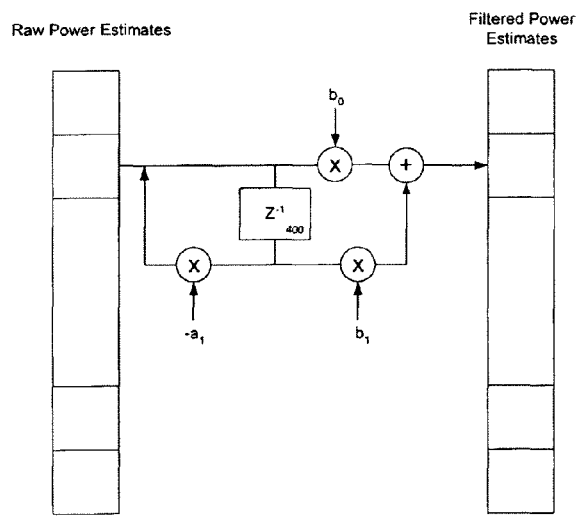
FIG. 8 illustrates a filter.

FIG. 8 shows an exemplary implementation of the filter as single pole infinite Impulse Response (IIR) filter with single memory/delay element 404 where the filter parameters $a_1$, $b_0$, $b_1$ determine the frequency response of the filter and are adjusted depending on the dynamic of the channel (unit 205 of FIG. 6), relative pilot signal power (unit 303 of FIG. 7) and noise power (unit 304 of FIG. 7). It should however be stressed that other filter architectures are known to the person skilled in the art and could be used instead to implement this low-pass filter. The group delay response of the different filters significantly varies with the filter being used. Hence, the delay in the generation of the power estimates will vary according to the filter. In order to achieve good performance in the demodulation of unit 111, it is usually beneficial to align in time the noise power estimate with the data samples being processed.

Depending on the system considered, the dynamic range of the relative pilot signal power is predefined and thus with this knowledge at the receiver, the estimated relative pilot signal power can contained within the known range. The known dynamic range can be used to provide a reliability test of the estimate, i.e. when the estimate exceeds a predefined threshold, the estimate is deemed unreliable and previous estimate or a default estimate could be used. For example, CPICH power allocation for sufficient cell coverage and network capacity limit the relative CPICH power to the range of −3 dB to −13 dB. Therefore if the estimated relative CPICH power exceeds this range, it should be clipped or deemed unreliable and previous estimate is used.

The estimation of the two parameters, relative CPICH power $a_{CPICH,k}/E_T$ and noise power, $\tilde{N}_{o,k}$, can be obtained by solving at least two simultaneous equations containing the parameters as unknowns. As mentioned before, the simultaneous equations can be obtained by over-sampling the power of the received signal represented in Equation 2. The following discussion uses over-sampling of two for simplicity, but the invention applies to two or more times over-sampling as discussed hereinbefore.

Based on Equation 2, the two samples derived from the over-sampling of the received signal can be written as follows, assuming the cross-correlation of the transmitted chips and the correlation of the transmitted chips and noise component are zero. The over-sampled channel impulse response, $\hat{h}_1$ and $\hat{h}_2$, and the power of the transmitted signal, $\tilde{r}_{k,1}$ and $\tilde{r}_{k,2}$ are assumed to be static within the observation window, W.

$$E[\tilde{r}_{k,1}\tilde{r}_{k,1}^*] = E\begin{bmatrix}\left(\sum_{c1=1}^{C}\hat{h}_1^H S_{c1,k}a_{c1} + \tilde{n}_{k,1},\right)\\ \left(\sum_{c2=1}^{C}S_{c2,k}^H\hat{h}_1 a_{c2} + \tilde{n}_{k,1}^*,\right)\end{bmatrix}$$ Equation 11

$$= E\begin{bmatrix}\sum_{c1=1}^{C}\hat{h}_1^H S_{c1,k}a_{c1}\sum_{c2=1}^{C}S_{c2,k}^H\hat{h}_1 a_{c2} + \\ \tilde{n}_{k,1}\tilde{n}_{k,1}^* + \\ \sum_{c1=1}^{C}\hat{h}_1^H S_{c1,k}a_{c1}\tilde{n}_{k,1}^* + \\ \sum_{c2=1}^{C}S_{c2,k}^H\hat{h}_1 a_{c2} + \tilde{n}_{k,1}\end{bmatrix}$$

$$= E\left[\hat{h}_1^H \sum_{c=1}^{C}a_c^2 S_{c,k}S_{c,k}^H\hat{h}_1 + \tilde{n}_{k,1}\tilde{n}_{k,1}^*\right]$$

$$= \hat{h}_1^H \hat{h}_1 \sum_{c=1}^{C}a_c^2 + \tilde{N}_o$$

$$= \frac{1}{a_{CPICH}^2}\hat{h}_1^H\hat{h}_1 E_T + \tilde{N}_o$$

where $\tilde{r}_{k,1}$ is the $k^{th}$ first over-sample
$\tilde{r}_{k,2}$ is the $k^{th}$ second over-sample
$\hat{h}_1$ is the first over-sample channel response
$\hat{h}_2$ is the second over-sample channel response
S is the spreading sequence a is the amplitude of the channel
n is noise
corresponding to the definitions set out for Equation 1
For the first sample, $R_1$ $$R_1 = \frac{1}{W}\sum_{k=1}^{W}\tilde{r}_{k,1}\tilde{r}_{k,1}^* \approx \frac{E_T}{a_{CPICH}^2}\hat{h}_1^H\hat{h}_1 + \tilde{N}_o$$

For the second sample $R_2$ $$R_2 = \frac{1}{W}\sum_{k=1}^{W}\tilde{r}_{k,2}\tilde{r}_{k,2}^* \approx \frac{E_T}{a_{CPICH}^2}\hat{h}_2^H\hat{h}_2 + \tilde{N}_o$$ Equation 12

In each case the average noise power $\tilde{N}_0$ should be the same. In the following analysis, we will normalise the transmitted signal component to unity, i.e. $E_T=1$, after AGC is solved as:

$$\frac{a_{CPICH}^2}{E_T} \approx \frac{\hat{h}_1^H\hat{h}_1 - \hat{h}_2^H\hat{h}_2}{R_1 - R_2}$$ Equation 13

$$\tilde{N}_o \approx R_1 - \frac{E_T}{a_{CPICH}^2}\hat{h}_1^H\hat{h}_1 \approx R_2 - \frac{E_T}{a_{CPICH}^2}\hat{h}_2^H\hat{h}_2 \approx$$ Equation 14

$$\frac{1}{2}\left(R_1 - \frac{E_T}{a_{CPICH}^2}\hat{h}_1^H\hat{h}_1 + R_2 - \frac{E_T}{a_{CPICH}^2}\hat{h}_2^H\hat{h}_2\right)$$

Note that in Equation 11 and Equation 12 the average receive signal power within the observation window, $R_1$ and $R_2$, are obtained by assuming the cross-correlation of the transmitted chips and the correlation of the transmitted chip and noise component is zero, which is inaccurate within the averaging window, W. Therefore, filtering is required to reduce the 'noise' from the effect of limited windowing length.

The averaging window size to obtain a good estimate of $E[\tilde{r}_{k,1}\tilde{r}_{k,1}^*]$ and $E[\tilde{r}_{k,2}\tilde{r}_{k,2}^*]$ needs to take into account the dynamic nature of the channel since the average of the received signal power and the dynamic estimated channel impulse response should match. Therefore, with the delay introduced through filtering, timing of the average received signal power and the estimated channel impulse response used for the derivation of parameters for equalisation need to match as will be discussed later.

The representation of the received signal in Equation 1 will need modification with the application of open and closed loop transmit diversity mode. The received signals, showing contribution to the transmission from different transmit antenna, i.e., $r_k^1$ from antenna 1 and $r_k^2$ from antenna 2, is given below (see Section 7.2 of 3GPP TS25.214 Technical Specification Group Radio Access Network: User Equipment (UE) radio transmission and reception (FDD for a further discussion on transmit diversity)):

$$\tilde{r}_k = \tilde{r}_k^1 + \tilde{r}_k^2 + \tilde{n}_k$$ Equation 15

$$= \sum_{c=1}^{C}\hat{h}_k^{1^H}S_{c,k}^1 a_{c,k}^1 + \sum_{c=1}^{C}\hat{h}_k^{2^H}S_{c,k}^2 a_{c,k}^2 + \tilde{n}_k$$

$$= \sum_{c=1,STTD\,or\,NoTxDiv}^{C}\hat{h}_k^{1^H}S_{c,k}^1 a_{c,k}^1 +$$

-continued $$\sum_{c=1, STTD \text{ or } NoTxDiv}^{C} \tilde{h}_k^{2^H} S_{c,k}^2 a_{c,k}^2 +$$

$$w_1 \sum_{c=1, CLTD}^{C} \tilde{h}_k^{1^H} S_{c,k}^1 a_{c,k}^1 +$$

$$w_2 \sum_{c=1, CLTD}^{C} \tilde{h}_k^{2^H} S_{c,k}^1 a_{c,k}^1 + \tilde{n}_k$$

where $w_1 = 1/\sqrt{2}$ and $w_2 \in$ (is selected from a set comprising)

$$\left\{ \frac{1}{2}(1+i), \frac{1}{2}(1-i), \frac{1}{2}(-1+i), \frac{1}{2}(-1+i) \right\}$$

is the Close Loop Transmit Diversity (CLTD) weight, known to the user equipment receiving the signal. Note that signal obtained from other user equipment is assumed not to be in CLTD mode. The subscript STTD denotes the channel utilising open loop space-time transmit diversity (STTD) mode and the subscript NoTxDiv denotes the channel with single antenna transmission, i.e. without transmit diversity.

Based on Equation 11 and Equation 12 the received signal power of can expanded with the received signal from the two antennae as follows:

$$E\{\tilde{r}_k \tilde{r}_k^*\} = E\{\tilde{r}_k^1 \tilde{r}_k^{1*} + \tilde{r}_k^1 \tilde{r}_k^{2*} + \tilde{r}_k^2 \tilde{r}_k^{2*}\} + \tilde{N}_{o,k} \quad \text{Equation 16}$$

For space-time transmit diversity the products $\tilde{r}_k^1 \tilde{r}_k^{2*}$ and $\tilde{r}_k^2 \tilde{r}_k^{1*}$ average to zero.

Where the autocorrelation of the received signal from the transmit antennae, given the total transmit energy from transmit antennae 1 and antennae 2 are $a_{Tx1}^2$ and $a_{Tx2}^2$ and the CPICH energy from antenna 1 and antenna 2 are $a_{CPICH}^1$ and $a_{CPICH}^2$, respectively then:

$$E\{\tilde{r}_k^1 \tilde{r}_k^{1*}\} = E\left\{ \left( \sum_{c1=1}^{C} \tilde{h}_k^1 S_{c1,k}^1 a_{c1,k}^1 \right) \left( \sum_{c2=1}^{C} a_{c2,k}^{1*} S_{c2,k}^{1^H} \tilde{h}_k^1 \right) \right\} \quad \text{Equation 17}$$

$$= a_{Tx1}^2 \tilde{h}_k^{1^H} \tilde{h}_k^1$$

$$= a_{Tx1}^2 \frac{1}{a_{CPICH}^{1^2}} \hat{h}_k^{1^H} \hat{h}_k^1$$

$$E\{\tilde{r}_k^2 \tilde{r}_k^{2*}\} = E\left\{ \left( \sum_{c1=1}^{C} \tilde{h}_k^2 S_{c1,k}^2 a_{c1,k}^2 \right) \left( \sum_{c2=1}^{C} a_{c2,k}^{2*} S_{c2,k}^{2^H} \tilde{h}_k^2 \right) \right\}$$

$$= a_{Tx2}^2 \frac{1}{a_{CPICH}^{2^2}} \hat{h}_k^{2^H} \hat{h}_k^2$$

and the cross-correlation of the received signal is as follows:

$$E\{\tilde{r}_k^1 \tilde{r}_k^{2*}\} = E\left\{ \left( \sum_{c1=1}^{C} \tilde{h}_k^{1^H} S_{c1,k}^1 a_{c1,k}^1 \right) \left( \sum_{c2=1}^{C} a_{c2,k}^{2*} S_{c2,k}^{2^H} \tilde{h}_k^2 \right) \right\} \quad \text{Equation 18}$$

-continued $$= E\left\{ \begin{pmatrix} \sum_{c=,1,STTD \text{ or } NoTxDiv}^{C} \tilde{h}_k^{1^H} S_{c,k}^1 a_{c,k}^1 + \\ w_1 \sum_{c=1,CLTD}^{C} \tilde{h}_k^{1^H} S_{c,k}^1 a_{c,k}^1 \end{pmatrix} \begin{pmatrix} \sum_{c=1,STTD \text{ or } NoTxDiv}^{C} a_{c,k}^2 S_{c,k}^{2^H} \tilde{h}_k^2 + \\ w_2^* \sum_{c=1,CLTD}^{C} a_{c,k}^1 S_{c,k}^{1^H} \tilde{h}_k^2 \end{pmatrix} \right\}$$

$$= E\left\{ \begin{array}{l} \sum_{c=,1,STTD \text{ or } NoTxDiv}^{C} \tilde{h}_k^{1^H} S_{c,k}^1 a_{c,k}^1 \\ \sum_{d=1,STTD \text{ or } NoTxDiv}^{C} a_{d,k}^2 S_{d,k}^{2^H} \tilde{h}_k^2 + \\ w_2 \sum_{c=1,STTD \text{ or } NoTxDiv}^{C} \tilde{h}_k^{1^H} S_{c,k}^1 a_{c,k}^1 \\ \sum_{c=1,CLTD}^{C} a_{d,k}^1 S_{d,k}^{1^H} \tilde{h}_k^2 + \\ w_1 \sum_{c=1,CLTD}^{C} \tilde{h}_k^{1^H} S_{c,k}^1 a_{c,k}^1 \\ \sum_{d=1,STTD \text{ or } NoTxDiv}^{C} a_{d,k}^2 S_{d,k}^{2^H} \tilde{h}_k^2 + \\ w_1 w_2^* \sum_{c=1,CLTD}^{C} \tilde{h}_k^{1^H} S_{c,k}^1 a_{c,k}^1 \\ \sum_{c=1,CLTD}^{C} a_{d,k}^1 S_{d,k}^{1^H} \tilde{h}_k^2 \end{array} \right\}$$

$$= a_{CLTD}^2 w_1 w_2^* \tilde{h}_k^{1^H} \tilde{h}_k^2$$

$$= a_{CLTD}^2 w_1 w_2^* \frac{1}{a_{CPICH}^1 a_{CPICH}^2} \hat{h}_k^{1^H} \hat{h}_k^2$$

Therefore, assuming that the total transmit power from antenna 1 and 2 are equivalent, i.e.

$$a_{Tx1}^2 = a_{Tx2}^2 = \frac{1}{2} E_T,$$

that the CPICH energy from the two transmit antennae are equivalent, i.e. $a^1{}_{CPICH}{}^2 = a^1{}_{CPICH}{}^2 = a_{CPICH}{}^2/2$, Equation 16 is rewritten as:

$$E\{\tilde{r}_k \tilde{r}_k^*\} = a_{Tx1}^2 \frac{1}{a_{CPICH}^{1^2}} \hat{h}_k^{1^H} \hat{h}_k^1 + a_{Tx2}^2 \frac{1}{a_{CPICH}^{2^2}} \hat{h}_k^{2^H} \hat{h}_k^2 + \quad \text{Equation 19}$$

$$2\text{Re}\left[ a_{CLTD}^2 w_1 w_2^* \frac{1}{a_{CPICH}^1 a_{CPICH}^2} \hat{h}_k^{1^H} \hat{h}_k^2 \right] + \tilde{N}_o$$

$$= \frac{E_T}{a_{CPICH}^2} \left( \hat{h}_k^{1^H} \hat{h}_k^1 + \hat{h}_k^{2^H} \hat{h}_k^2 \right) + \frac{a_{CLTD}^2}{a_{CPICH}^2}$$

$$\text{Re}\left[ w_1 w_2^* \hat{h}_k^{1^H} \hat{h}_k^2 \right] + \tilde{N}_o$$

Assuming that the user's equipment HS-PDSCH are the only channel with CLTD mode (the associated DSCH will also be in CLTD mode as described in Section 7.1 of 3GPP TS 25.214 Technical Specification Group Radio Access Network: Physical layer procedures (FDD), but is assumed negligible in the analysis), the total transmit energy of the channel with CLTD can be represented in terms of the $E_c I_{or}$ of the HS-PDSCH as follows:

$$\frac{E_c}{I_{or\ HS-PDSCH}} = \frac{2a^2_{CLTD}}{E_T} \quad \text{Equation 20}$$

Thus, the received signal power is represented as follows:

$$E\{\tilde{r}_k \tilde{r}^*_k\} = \frac{E_T}{a^2_{CPICH}} \left( \begin{array}{c} \left(\hat{h}^{1H}_k \hat{h}^1_k + \hat{h}^{2H}_k \hat{h}^2_k\right) + \\ 2\frac{E_c}{I_{or\ HS-PDSCH}} \text{Re}\left[w_1 w^*_2 \hat{h}^{1H}_k \hat{h}^2_k\right] \end{array} \right) + \tilde{N}_o \quad \text{Equation 21}$$

$$= \frac{E_T}{a^2_{CPICH}} \Lambda_k + \tilde{N}_o$$

where $$\Lambda_k = \left(\hat{h}^{1H}_k \hat{h}^1_k + \hat{h}^{2H}_k \hat{h}^2_k\right) + 2\frac{E_c}{I_{or\ HS-PDSCH}} \text{Re}\left[w_1 w^*_2 \hat{h}^{1H}_k \hat{h}^2_k\right]$$

Based on Equation 13 and Equation 14, and comparing Equation 11 and Equation 21, the estimated relative CPICH magnitude and noise power for UE in CLTD mode is given as follows:

$$\frac{a^2_{CPICH}}{E_T} \approx \frac{\Lambda_1 - \Lambda_2}{R_1 - R_2} \quad \text{Equation 22}$$

$$\tilde{N}_o \approx \frac{1}{2}\left(R_1 - \frac{E_T}{a^2_{CPICH}}\Lambda_1 + R_2 - \frac{E_T}{a^2_{CPICH}}\Lambda_2\right) \quad \text{Equation 23}$$

Where, as before, the combined channel term for the oversampling k=1,2 is $$\Lambda_k = \left(\hat{h}^{1H}_k \hat{h}^1_k + \hat{h}^{2H}_k \hat{h}^2_k\right) + 2\frac{E_c}{I_{or\ HS-PDSCH}} \text{Re}\left[w_1 w^*_2 \hat{h}^{1H}_k \hat{h}^2_k\right]. \quad \text{Equation 24}$$

Note that for low HS-PDSCH Ec/Ior, the second term of Equation 24 can be ignored.

The relative CPICH magnitude and noise power for user equipment in CLTD mode can be represented in terms of the ratio of the total HS-PDSCH power to the CPICH power:

$$\frac{E_{c,HS-PDSCH}}{a^2_{CPICH}} = \frac{E_T}{a^2_{CPICH}} \cdot \frac{E_c}{I_{or\ HS-DPDSCH}}.$$

According to section 6A.2 of TS25.214, the user equipment shall assume a total received HS-PDSCH power of $P_{HSPDSCH} = P_{CPICH} + \Gamma + \Delta$ in dB, where the total received power is evenly distributed among the HS-PDSCH codes of the reported CQI value, the measurement power offset $\Gamma$ is signalled by higher layers and the reference power adjustment $\Delta$ is given by Table 7A, 7B, 7C, 7D, or 7E depending on the UE category. Thus, the ratio of the total HS-PDSCH power to the CPICH power can be obtained from $$\frac{E_{c,HS-PDSCH}}{a^2_{CPICH}} = 10\log(P_{HSPDSCH} - P_{CPICH})$$

since the measurement power offset and the reference power adjustment is known at the UE.

Representing the combined channel term in Equation 24 as follows:

$$\Lambda_k = \left(\hat{h}^{1H}_k \hat{h}^1_k + \hat{h}^{2H}_k \hat{h}^2_k\right) + 2\frac{E_c}{I_{or\ HS-PDSCH}} \text{Re}\left[w_1 w^*_2 \hat{h}^{1H}_k \hat{h}^2_k\right] \quad \text{Equation 25}$$

$$= \left(\hat{h}^{1H}_k \hat{h}^1_k + \hat{h}^{2H}_k \hat{h}^2_k\right) + 2\frac{E_{c,HS-PDSCH}}{a^2_{CPICH}} \frac{a^2_{CPICH}}{E_T} \text{Re}\left[w_1 w^*_2 \hat{h}^{1H}_k \hat{h}^2_k\right]$$

$$= X_k + \frac{a^2_{CPICH}}{E_T} Y_k$$

$$X_k = \left(\hat{h}^{1H}_k \hat{h}^1_k + \hat{h}^{2H}_k \hat{h}^2_k\right)$$

$$Y_k = 2\frac{E_{c,HS-PDSCH}}{a^2_{CPICH}} \text{Re}\left[w_1 w^*_2 \hat{h}^{1H}_k \hat{h}^2_k\right]$$

gives the following representation for the relative CPICH magnitude and noise power for UE in CLTD mode:

$$\frac{a^2_{CPICH}}{E_T} \approx \frac{X_1 - X_2}{R_1 - R_2 - (Y_1 - Y_2)} \quad \text{Equation 26}$$

$$\tilde{N}_o \approx \frac{1}{2}\left(R_1 + R_2 - \frac{E_T}{a^2_{CPICH}}(X_1 + X_2)(Y_1 + Y_2)\right). \quad \text{Equation 27}$$

The above analysis to provide the noise power estimate can be generalised to data transmission from more than two antennas at the serving node. If N transmit antennas are considered and ignoring the CLTD term, the noise estimate is given with the combined channel term in Equation 25 modified to $$\Lambda_k = \sum_{n=1}^{N} \hat{h}^{nH}_k \hat{h}^n_k. \quad \text{Equation 28}$$

It is thus possible to estimate the relative noise power and pilot signal power in a communications network at a user's mobile device.

The processing functions described herein can be implemented in hardware, software or a combination thereof depending on the resources and components provided within a mobile device.

The result of equation 27 can be used to provide channel quailty indicators. For example, a CQI can be calculated for the HS-PDSCH (High Speed Physical Downlink Shared Channel) using the equation:

$$CQI = \begin{cases} 0 & SNR \leq -16 \\ \left\lfloor \frac{SNR}{1.02} + 16.62 \right\rfloor & -16 < SNR < 14 \\ 30 & 14 \leq SNR \end{cases}$$

where SNR is the power ratio of the HS-PDSCH channel and noise, and is given by:

$$SNR = \frac{\tilde{E}_{c,HS-PDSCH}}{\tilde{N}_o}$$

$$= c\frac{\tilde{E}_{c,CPICH}}{\tilde{N}_o}$$

$$= c\frac{\hat{h}^H \hat{h}}{\tilde{N}_o}$$

The quantity in the denominator comes from equation 27 and the power of the data channel is derived from the power of the estimated channel $\hat{h}^H\hat{h}$ and the power ratio $$c = \frac{\tilde{E}_{c,HS-PDSCH}}{\tilde{E}_{c,CPICH}} = 10^{(P_{HSPDSCH}-P_{CPICH})/10}$$

given by the relation $P_{HSPDSCH}P_{CPICH}+\Gamma+\Delta$ that was discussed earlier. It will be apparent that the CQI could be evaluated using the quantities $R_k$, $X_k$ and $Y_k$ without explicitly calculating $\tilde{N}_{o,k}$. (In a similar manner, the equaliser coefficients $W_k$ (see equations 4 and 10 above) can be calculated from $R_k$, $X_k$ and $Y_k$ without explicitly calculating the quantities $\tilde{N}_{o,k}$ and $$\frac{a^2_{CPICH,k}}{E_{T,k}}.\Big)$$

In the embodiments discussed thus far, the oversampling has been of a temporal nature where a plurality of sampling phrases occur within the duration of one chip of the signal r. However, this temporal oversampling can be replaced, or supplemented, with spatial oversampling. In the case of spatial oversampling, a plurality of receive antennae are provided each producing its own version of each chip of signal r. In the case where spatial oversampling is used, subscript indices 1 and 2 in equations 11-27 refer to (except in $w_1$ and $w_2$) signals originating with first and second receive antennae respectively and the subscript index k, when used in the context of oversampling in equations 11-27 refers to a signal originating with the $k^{th}$ receive antenna.

The invention claimed is:

1. A method of assessing a received signal acquired through a physical channel and comprising a pilot channel and noise, the method being performed, at least in part, by hardware of a mobile device, the method comprising estimating from an oversampled version of the received signal a set of responses for the physical channel corresponding to different sampling phases of the received signal and quantifying the noise in the received signal using the oversampled received signal and the set of estimated channel responses.

2. A method according to claim 1, wherein the oversampling in the received signal and its set of estimated channel responses is at least partially temporal.

3. A method according to claim 1, wherein the oversampling in the received signal and its set of estimated channel responses is at least partially spatial by virtue of reception diversity.

4. A method according to claim 1, wherein the received signal utilises a transmit diversity scheme whose effects are taken into account.

5. A method as claimed in claim 1, wherein the estimation process is constrained to a time window.

6. A method as claimed in claim 1, wherein values of the oversampled version of the received signal and the set of estimated channel responses are used to evaluate a solution for simultaneous equations linking the noise in the received signal to the power of the pilot channel taken relative to a total signal power of the received signal.

7. A method as claimed in claim 6, wherein noise values and relative pilot channel power values yielded by said solution are filtered.

8. A method of assessing a received signal acquired through a physical channel and comprising a pilot channel and noise, the method being performed, at least in part, by hardware of a mobile device, the method comprising estimating from an oversampled version of the received signal a set of responses for the physical channel corresponding to different sampling phases of the received signal and deducing the relation of the power of the pilot channel to the power of the entire received signal using the oversampled received signal and the set of estimated channel responses.

9. A method of deducing filter coefficients for an equaliser that is to act on a received signal acquired through a physical channel and comprising a pilot channel and noise, the method being performed, at least in part, by hardware of a mobile device, the method comprising estimating from an oversampled version of the received signal a set of responses for the physical channel corresponding to different sampling phases of the received signal and applying the oversampled received signal and the set of estimated channel responses in the deduction of the filter coefficients.

10. Apparatus for assessing a received signal acquired through a physical channel and comprising a pilot channel and noise, the apparatus comprising means for estimating from an oversampled version of the received signal a set of responses for the physical channel corresponding to different sampling phases of the received signal and means for quantifying the noise in the received signal using the oversampled received signal and the set of estimated channel responses.

11. Apparatus according to claim 10, wherein the oversampling in the received signal and its set of estimated channel responses is at least partially temporal.

12. Apparatus according to claim 10, wherein the oversampling in the received signal and its set of estimated channel responses is at least partially spatial by virtue of reception diversity.

13. Apparatus according to claim 10, wherein the received signal utilises a transmit diversity scheme whose effects are taken into account.

14. Apparatus according to claim 10, wherein the estimation means is constrained to a time window on the oversampled version of the received signal.

15. Apparatus according to claim 10, further comprising means for using values of the oversampled version of the received signal and the set of estimated channel responses to evaluate a solution for simultaneous equations linking the noise in the received signal to the power of the pilot channel taken relative to a total signal power of the received signal.

16. Apparatus according to claim 15, further comprising means for filtering noise values and relative pilot channel power values yielded by said solution.

17. Apparatus for assessing a received signal acquired through a physical channel and comprising a pilot channel and noise, the apparatus comprising means for estimating from an oversampled version of the received signal a set of responses for the physical channel corresponding to different sampling phases of the received signal and means for deducing the relation of the power of the pilot channel to the power of the entire received signal using the oversampled received signal and the set of estimated channel responses.

18. Apparatus for deducing filter coefficients for an equaliser that is to act on a received signal acquired through a physical channel and comprising a pilot channel and noise, the apparatus comprising means for estimating from an oversampled version of the received signal a set of responses for the physical channel corresponding to different sampling phases of the received signal and means for applying the oversampled received signal and the set of estimated channel responses in the deduction of the filter coefficients.

* * * * *